(12) United States Patent
Pol et al.

(10) Patent No.: US 12,514,529 B2
(45) Date of Patent: Jan. 6, 2026

(54) SYSTEM AND METHOD FOR MEASURING REAL-TIME BODY KINEMATICS

(71) Applicant: TEXAS TECH UNIVERSITY SYSTEM, Lubbock, TX (US)

(72) Inventors: Suhas Pol, Lubbock, TX (US); Kerry K. Gilbert, Lubbock, TX (US); Phillip S. Sizer, Lubbock, TX (US); Richard Ellis, Auckland (NZ)

(73) Assignee: Texas Tech University System, Lubbock, TX (US)

( * ) Notice: Subject to any disclaimer, the term of this patent is extended or adjusted under 35 U.S.C. 154(b) by 134 days.

(21) Appl. No.: 16/645,181

(22) PCT Filed: Sep. 6, 2018

(86) PCT No.: PCT/US2018/049770
§ 371 (c)(1),
(2) Date: Mar. 6, 2020

(87) PCT Pub. No.: WO2019/051099
PCT Pub. Date: Mar. 14, 2019

(65) Prior Publication Data
US 2021/0161496 A1     Jun. 3, 2021

Related U.S. Application Data

(60) Provisional application No. 62/554,883, filed on Sep. 6, 2017.

(51) Int. Cl.
*A61B 6/00*     (2024.01)
*A61B 5/055*    (2006.01)
(Continued)

(52) U.S. Cl.
CPC ............ *A61B 6/5217* (2013.01); *A61B 5/055* (2013.01); *A61B 6/032* (2013.01); *A61B 8/485* (2013.01);
(Continued)

(58) Field of Classification Search
CPC ....... A61B 6/5217; A61B 5/055; A61B 6/032; A61B 8/485; A61B 8/5223; A61B 8/08;
(Continued)

(56) References Cited

U.S. PATENT DOCUMENTS

2004/0143189 A1* 7/2004 Lysyansky .......... G01S 7/52066
600/450
2005/0070798 A1* 3/2005 Pedrizzetti .......... G01S 7/52042
600/442
(Continued)

FOREIGN PATENT DOCUMENTS

EP          1876567 A1 *  1/2008  ............... G06T 7/12
WO    WO-2015104582 A1 *  7/2015  ............. A61B 8/429
WO          2019051099 A1    3/2019

OTHER PUBLICATIONS

Authorized Officer Doreen Golze; International Search Report and Written Opinion; PCT/US2018/049770; date of mailing Dec. 19, 2018; 14 pages.
(Continued)

*Primary Examiner* — Keith M Raymond
*Assistant Examiner* — Andrew W Begeman
(74) *Attorney, Agent, or Firm* — Dickinson Wright PLLC; Kristopher Lance Anderson

(57) ABSTRACT

Disclosed is a system and method for a system and method for an image processing-based approach has been developed for in vivo quantification of tissue and body fluid kinematics when certain human movements, physical loads and physiological stresses are experienced. Due to the absence of
(Continued)

artificial or physical markers in those tissues or fluids during typical imaging (ultrasound, CT-scan or MRI), a virtual marker displacement and deformation scheme has been developed to measure movement and strain of both tissues and body fluids.

19 Claims, 6 Drawing Sheets

(51) Int. Cl.
    *A61B 6/03*     (2006.01)
    *A61B 8/00*     (2006.01)
    *G06T 7/00*     (2017.01)
    *G16H 15/00*     (2018.01)
    *G16H 30/20*     (2018.01)
    *G16H 30/40*     (2018.01)
    *G16H 50/70*     (2018.01)

(52) U.S. Cl.
    CPC .......... *A61B 8/5223* (2013.01); *G06T 7/0012* (2013.01); *G16H 15/00* (2018.01); *G16H 30/20* (2018.01); *G16H 30/40* (2018.01); *G16H 50/70* (2018.01); *G06T 2207/10081* (2013.01); *G06T 2207/10088* (2013.01); *G06T 2207/10132* (2013.01); *G06T 2207/30004* (2013.01)

(58) Field of Classification Search
    CPC ................ A61B 5/4041; G06T 7/0012; G06T 2207/10081; G06T 2207/10088; G06T 2207/10132; G06T 2207/30004; G06T 7/20; G16H 15/00; G16H 30/20; G16H 30/40; G16H 50/70
    See application file for complete search history.

(56) References Cited

U.S. PATENT DOCUMENTS

| | | | |
|---|---|---|---|
| 2009/0318803 A1* | 12/2009 | Abe | A61B 8/08 600/443 |
| 2011/0237949 A1* | 9/2011 | Zhao | A61B 8/08 600/443 |
| 2014/0147028 A1 | 5/2014 | Zheng et al. | |
| 2014/0357996 A1* | 12/2014 | Miller | G01S 7/52042 600/438 |
| 2015/0005637 A1 | 1/2015 | Stegman et al. | |
| 2015/0335308 A1* | 11/2015 | Pedrizzetti | A61B 8/5207 600/454 |
| 2016/0317079 A1* | 11/2016 | Newman | A61B 5/1121 |

OTHER PUBLICATIONS

Revell et al: "Computer Vision Elastography: Speckle Adaptive Motion Estimation for Elastography Using Ultrasound Sequences", IEEE Transactions on Medical Imaging, vol. 24, No. 6, 2005, DOI: 10.1109/TMI.2005.848331, 12 pages.
Dilley A et al: "The use of cross-correlation analysis between high-frequency ultrasound images to measure longitudinal median nerve movement", Ultrasound in Medicine and Biol, NY, US, vol. 27, No. 9, 2001, DOI: 10.1016/ S0301-5629(01) 00413-6, 8 pages.
Abraham, T., et al., "Role of tissue Doppler and strain echocardiography in current clinical practice". Circulation. 2007; 116(22):2597-2609; 13 pages.
Adrian, R., "Particle-imaging techniques for experimental fluid mechanics". Annual Review of Fluid Mechanics. 1991 ;23(1):261-304.
Adrian, R., "Twenty years of particle image velocimetry". Experiments in Fluids. Aug. 2005;39(2): 159-169.
Andrade, R., et al., "Non-invasive assessment of sciatic nerve stiffness during human ankle motion using ultrasound shear wave elastography". Journal of Biomechanics. 2016;49:326-331; 6 pages.
Boyd, B., et al., "Altered tibial nerve biomechanics in patients with diabetes mellitus". Muscle and Nerve. 2014;50(2):216-223; 8 pages.
Cassel, M., et al., "Prevalence of Achilles and patellar tendinopathy and their association to intratendinous changes in adolescent athletes". Scandinavian Journal of Medicine & Science in Sports. 2015;25(3):e310-e318. 9 pages.
Cook, J., et al., "Revisiting the continuum model of tendon pathology: What is its merit in clinical practice and research?" British Journal of Sports Medicine (2016);50:1187-1191; 7 pages.
Dilley, A., et al. "The use of cross-correlation analysis between high-frequency ultrasound images of longitudinal median nerve movement", Ultrasound in Medicine and Biology; 2001; vol. 27, No. 9, pp. 1211-1218; 8 pages.
Dilley, A., et al., "Longitudinal sliding of the median nerve in patients with non-specific arm pain". Manual Therapy. 2008; 13:536-543. 8 pages.
Dilley, A., et al., "Quantitative in vivo studies of median nerve sliding in response to wrist, elbow, shoulder and neck movements". Clinical Biomechanics. 2003;18(10):899-907. 9 pages.
Docking, S., et al. "Pathological tendons maintain sufficient aligned fibrillar structure on ultrasound tissue characterization (UTC)". Scandinavian Journal of Medicine and Science in Sports. 2016;26(6):675-683; 9 pages.
Ellis, R., et al., "Is there a relationship between impaired median nerve excursion and carpal tunnel syndrome? A systematic review". Journal of Hand Therapy (2017) 3-12; 10 pages.
Gilbert, K., et al., "Effects of lower limb neurodynamic mobilization on intraneural fluid dispersion of the fourth lumbar herve root: An unembalmed cadaveric investigation". Journal of Manual and Manipulative Therapy. 2015;23 (5):239-245; 8 pages.
Gilbert, K., et al., "Effects of simulated neural mobilization on fluid movement in cadaveric peripheral nerve sections: Implications for the treatment of neuropathic pain and dysfunction". Journal of Manual and Manipulative Therapy. 2015;23(4):219-225. 8 pages.
Kuwabara, S., "Peripheral nerve disorders as common diseases". Brain and Nerve. 2013;65(7): 1071-1075.
Ochi, K., et al., "Shoulder position increases ulnar nerve strain at the elbow of patients with cubital tunnel syndrome". Journal of Shoulder and Elbow Surgery. 2015;24(9): 1380-1385; 6 pages.
Remiche, G., et al., "Peripheral neuropathies, from diagnosis to treatment, review of the literature and lessons from the local experience". Revue Medicate de Bruxelles. 2013;34(4):211-220.
Revell, J., et al., "Computer Vision Elastography: Speckle Adaptive Motion Estimation for Elastography Using Ultrasound Sequences", IEEE Transactions on Medical Imaging, vol. 24, No. 6, 2005, pp. 755-766. 12 pages.
Thielicke, W., et al., "PIVlab—towards user-friendly, affordable and accurate digital particle image velocimetry in MATLAB". Journal of Open Research Software. 2014;2(1 ):e30.
International Bureau, International Preliminary Report on Patentability for PCT/US2018/049770 mailed on Mar. 19, 2020; 8 pages.
International Searching Authority, International Search Report and Written Opinion for PCT/US2018/049770 mailed on Dec. 19, 2018; 14 pages.
Ferziger, J., et al., "Computational methods for fluid dynamics". Springer Science & Business Media; 2012; p. 136.
Canadian Intellectual Property Office, Office Action for Canadian Application No. 3,076,744 mailed on Sep. 27, 2023; 5 pages.

\* cited by examiner

SYSTEM AND METHOD FOR MEASURING REAL-TIME BODY KINEMATICS

CROSS-REFERENCE TO RELATED APPLICATIONS

This application is a 35 U.S.C § 371 national application of PCT Application No. PCT/US18/49770, filed on Sep. 6, 2018, entitled "System And Method For Measuring Real-Time Body Kinematics", which is related to and claims priority to U.S. Provisional Patent Application Ser. No. 62/554,883, filed Sep. 6, 2017, entitled "System and Method for Measuring Real-Time Body Kinematics," the content of which both are incorporated by reference in their entirety.

This application includes material that is subject to copyright protection. The copyright owner has no objection to the facsimile reproduction by anyone of the patent disclosure, as it appears in the Patent and Trademark Office files or records, but otherwise reserves all copyright rights whatsoever.

TECHNICAL FIELD

The present disclosure relates in general to the field of kinematics. In particular, the present disclosure provides for image processing-based approach for in vivo quantification of internal tissue and body fluid kinematics when certain human movements, physical loads and physiological stresses are experienced. The disclosed systems and methods support a wide variety of scenarios and include various products and services.

STATEMENT OF FEDERALLY FUNDED RESEARCH

None.

BACKGROUND OF THE DISCLOSURE

As the body moves it produces continuously changing displacement, deformation and strain in numerous tissues that include muscles, ligament, tendons, fascia and nerves. Many neuromusculoskeletal disorders involve an inability of these different body tissues to mechanically respond to these mechanical inputs in an appropriate fashion. For example, 2.4-10% of people will suffer from nerve related pain during the course of their life. An impairment in a peripheral nerve's ability to slide and glide within surrounding tissue interfaces has been reported as a key aetiological factor for painful peripheral nerve disorders, such as carpal tunnel syndrome (CTS). If selected sections within a peripheral nerve cannot easily translate and deform within its interfacing tissue container, it may be exposed to greater amounts of strain. Additionally, other less mobile adjacent nerve sections will be required to accommodate for this excursion loss through additional unwanted deformation. In response, significant unwanted increases in nerve deformation and strain appear to play an important role in the exacerbating different painful peripheral nerve disorders.

Similarly, tendinopathy/tendinitis can develop in response to impaired tissue biomechanics. The prevalence of tendinopathy in adult athletes is reported to be as high as 36% for the Achilles tendon and 45% for the patellar tendon. The pathophysiology of tendinopathy involves adverse structural changes to the internal tendon matrix that impair tendon displacement, deformation and force transmission, ultimately resulting in pain.

Ultrasound imaging (USI) is becoming a popular tool for examining different body tissues. USI presents many advantages over other forms of medical imaging by producing real-time dynamic images, in a safe and inexpensive manner. Investigators can use USI to examine tissue biomechanics in many common clinical disorders that include peripheral nerve disorders[3], tendinopathy, and diabetes. However, there are several significant limitations of USI use for examining body tissues. While USI is a valuable tool for assessing tissue movement, its ability to assess deformation and strain is limited. For example, there are a limited number of investigations that have used USI to measure nerve displacement and strain, exhibiting methods that are cumbersome or analyses that rely on inferences, rather than a real-time analysis. Similar limitations are encountered for muscle, ligament, fascia and tendon assessment. Although there are methodologies that allow the use of USI to quantify pathologic tendon matrix changes, there are no reported techniques for simultaneous assessment of muscle, ligament, fascia or tendon displacement and strain.

It is therefore a need in the art to develop an economically feasible systems for assessing tissue displacement or strain, while utilizing real-time analysis.

SUMMARY OF THE DISCLOSURE

The present disclosure addresses failings in the art by providing a system and method for real-time dynamic imaging to allow simultaneous measurement of a range of tissue kinematic features, such as displacement and strain. By utilizing the advantages of USI technology, the present disclosure provides considerable opportunities for examining the physiological implications of impaired tissue kinematics, such as interstitial pressures, fluid movement and dispersion. This is exemplified in the analysis of axoplasmic flow and intraneural fluid dynamics in peripheral nerves. At present the in-vivo assessment of axoplasmic flow is lacking and intraneural fluid dynamics evaluation is confined to animal models or cadaveric research. Understanding the foundational biomechanical function of tissues will allow for improved diagnostic accuracy and predictive outcomes related to interventions for diabetic neuropathy, nerve injury (compression, tension, and shear), edema, and peripheral vascular disease.

It is therefore an object of the present disclosure to present a virtual marker (VM) displacement and deformation scheme that measures displacement and strain of both tissues and body fluids in a Lagrangian frame of reference. Tissue kinematics can be calculated without the presence of a large, notable natural marker in the image.

In one aspect, the present disclosure provides continuously variable (instantaneous) tissue kinematics can be determined using the VM method. The tissue kinematics can be calculated independent of imaging method such as, but not limited to, ultrasound, MRI, or CT-scan. In another aspect, all components of the strain tensor can be obtained. In yet another aspect of the present disclosure, spatial variation of tissue kinematics can be obtained by using multiple VM's. The method of the present disclosure is further capable of determining material kinematics on a surface or located internally and is not limited to biological tissue, as long as an image time series is obtained.

It is therefore an object of the present disclosure to provide a system for imaging a tissue, comprising: an apparatus for obtaining an image of a tissue, an image processing apparatus for determining a virtual marker (VM), wherein said image processing apparatus is capable of forming a coordinate system for determination of basis vectors, organizing said images into a time series of pairs, performing particle image velocimetry (PIV) or any other suitable analyses to obtain vector field time series, and placing VMs upon the initial images in order to align said VMs with the basis vectors, determining instantaneous dimension components of each VM, establishing a linear strain time series for each VM, and establishing an angular strain time series on each VM, and a display apparatus for recording and displaying the kinematics of the tissue. In one aspect the image is obtained from a group consisting of: ultrasound, magnetic resonance imaging (MRI), and CT scan. In another aspect, the system further comprises determination of spatial variation of tissue kinematics by using multiple VM's. In another aspect the system comprises determination of temporal variation of tissue kinematics by using multiple VM's. The system of the present disclosure may further determine both spatial and temporal variation of tissue kinematics by using multiple VM's. The image processing apparatus is further capable of populating images with artificial particles. The system of the present disclosure may further comprise a computer or processor for carrying out one or more of the above aspects of the system.

It is another object of the present disclosure to provide a method for determining tissue kinematics, comprising: obtaining an image time series; determining the dimension of the images; forming a coordinate system to determine basis vectors; organizing the images into a time series of pairs; performing particle image velocimetry (PIV)-based or or any other suitable analyses on each pair to obtain displacement vector field time series; forming virtual markers (VMs) on the initial image such that VM segments formed by its corners align with the basis vectors; correlating the path line of the VM corners for each VM using the vector field time series; determining a linear strain time series for each VM; determining an angular strain time series for each VM; and recording and displaying the kinematics of said tissue.

In one aspect, the method further comprises obtaining the image time series from a group consisting of: ultrasound, magnetic resonance imaging (MRI), and CT scan. In another aspect the method further comprises determining spatial variation of tissue kinematics by using multiple VM's. In another aspect the method comprises determining temporal variation of tissue kinematics by using multiple VM's. The method is further capable of determining both spatial and temporal variation of tissue kinematics by using multiple VM's. The method may further include populating images with artificial particles.

In a further aspect the present invention provides a non-transitory computer readable storage medium configured to store instructions that, when executed by a processor included in a computing device, cause the computing device to confirm the origin of a product, by carrying out steps of: obtaining an image time series, determining the dimension of the images, forming a coordinate system to determine basis vectors, organizing the images into a time series of pairs, performing particle image velocimetry (PIV)-based or any other cross-correlation analysis on each pair to obtain displacement vector field time series; forming virtual markers (VMs) on the initial image such that VM segments formed by its corners align with the basis vectors, correlating the path line of the VM corners for each VM using the vector field time series, determining a linear strain time series for each VM, determining an angular strain time series for each VM, and recording and displaying the kinematics of said tissue.

BRIEF DESCRIPTION OF THE DRAWINGS

The foregoing and other objects, features, and advantages of the disclosure will be apparent from the following description of embodiments as illustrated in the accompanying drawings, in which reference characters refer to the same parts throughout the various views. The drawings are not necessarily to scale, emphasis instead being placed upon illustrating principles of the disclosure.

DETAILED DESCRIPTION OF THE DISCLOSURE

Figure 1A:
FIG. 1A depicts an ultrasound image of a median nerve.

While the making and using of various embodiments of the present disclosure are discussed in detail below, it should be appreciated that the present disclosure provides many applicable inventive concepts that can be embodied in a wide variety of specific contexts, goods, or services. The specific embodiments discussed herein are merely illustrative of specific ways to make and use the disclosure and do not delimit the scope of the disclosure.

All publications and patent applications mentioned in the specification are indicative of the level of skill of those skilled in the art to which this disclosure pertains. All publications and patent applications are herein incorporated by reference to the same extent as if each individual publication or patent application was specifically and individually indicated to be incorporated by reference.

The present disclosure will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, compositions, or systems. Accordingly, embodiments may, for example, take the form of methods, compositions, compounds, materials, or any combination thereof. The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

It is therefore an embodiment of the present disclosure to provide a system and method for a imager processing-based approach has been developed for quantification of tissue and body fluid kinematics when certain human movements, physical loads and physiological stresses are experienced. Due to the absence of artificial or physical markers in those tissues or fluids during typical imaging (ultrasound, CT-scan or MRI), a virtual marker displacement and deformation scheme has been developed to measure movement and strain of both tissues and body fluids.

Measurement of displacement and strain in tissues and body fluids are important for determining the accuracy and objectivity of clinical tests and the effectiveness of treatment procedures. However, these cannot be determined using current state-of-the-art technology. The present disclosure's image-based technique quantifies the response to a procedure in real time, providing guidance to clinicians regarding specific examination measurements and the potential of therapies/interventions to change patients' status and improve health.

In contrast to the present disclosure, the current state-of-the-art approaches (e.g. color Doppler) require large scale anatomical structures (natural body markers) that are used for kinematic estimations (such as acceleration or strain) only in limited directions based on averages over time and space. Presently, shearwave elastography has been used to measure tissue stiffness (not strain) in the principle direction of the sonic wave. This method is typically used for tumor detection. Conversely, the present disclosure measures tissue and fluid kinematics regardless of material status and is not limited to tumor detection or measurement.

In one embodiment of the present disclosure, the system functions without the need for natural markers and yields all kinematic components of the strain tensor field at a much finer resolution than the prior art. Moreover, these yields are instantaneous and can represent ongoing changes in movement and strain, in addition to available averages over time.

In one embodiment the present disclosure presents an image-based technique that quantifies tissue kinematic response to a load, movement or procedure in real time, providing guidance to clinicians regarding the response to therapies/interventions incorporated in an individual patient. Images may be obtained from ultrasound, CT-scan, or MRI. Physicians rely on their experience and skillsets for determining the effects of specific therapeutic interventions on a case-by-case basis. While tools that objectify an intervention's therapeutic outcomes are desirable, they are not often available, where such results are usually unknown until it is too late to redirect the intervention for different outcomes. Such a delay could prolong or exacerbate a patient's symptoms, requiring additional diagnostic tests or interventions, potentially increasing costs and professional liabilities. In applying the system of the present disclosure, the probability of objectifying planned interventions or therapeutic outcomes so to ensure success of selected treatment strategies.

In an exemplary embodiment of the present disclosure, the system of the present disclosure is able to quantify scar tissue integrity following uterine Cesarean section (C-section), allowing OB-GYNs to reduce risk during subsequent labor and natural birthing procedures. Nearly one-in-three births in United States (US) occurs via C-section, increasing the necessity for choosing between another C-section versus natural vaginal delivery in subsequent pregnancies. There is an approximately 1% risk of uterine tear accompanied by the unavailability of an objective uterine scar tissue integrity measure, lending OB-GYNs to opting for C-section to avoid a mother's labor risks and their own increased professional liabilities. The present disclosure presents the opportunity to reduce planned C-sections and risky emergency C-sections that are 2-3 and 7-10 times more expensive than natural births, respectively.

In another embodiment, the present disclosure provides a method of treatment of a patient involving objectified biological factors for identification of tissue-based conditions, having application in physical therapy and other treatment and recovery regimens. In yet another embodiment, the present disclosure is capable of quantifying muscle deficiency for various conditions. For example, speech language pathology involves treatment of laryngeal muscular conditions, including deficiencies. The present disclosure is capable of augmenting current treatment and diagnostic protocols to enhancing therapy plans for improved speech characteristics.

In an exemplary embodiment of the present disclosure, a image processing-based approach has been developed for quantifying tissue and body fluid kinematics. Particle Image Velocimetery (PIV) or other correlation based image processing techniques estimate fluid velocity field by correlating flow tracer particle images separated by short time delays. However, the use of a velocity field for obtaining a displacement field and strain rate is confined to the Eularian frame of reference. As a result, measurements along a transitioning tissue or fluid continuum are not possible, because present PIV technologies cannot pair vectors with specific tissue or fluid segments.

In previous studies measuring tissue and fluid displacement and strain have been explored. Specific nerve displacements in a Lagrangian frame of reference have been obtained by identifying their location and cross-correlating subsequent images in a fashion similar to PIV, using an image time series obtained by high frequency USI. Further, strain on an identifiable body component, such as myocardial tissue, has been obtained by using a Tissue Doppler Imaging (TDI) method that estimates a velocity field through measuring Doppler shift. Both methods require that natural markers are identified within the image before these velocity fields can be estimated. However, such identifiable natural markers may not always be present in all tissue images, precluding the possibility of obtaining strain values with either method. Moreover, the number of strain components that could be estimated using these methods is limited. For example, TDI-based myocardial strain assessment is limited to a single component that represents either tissue shortening or lengthening.

In order to overcome the previously noted prior art limitations to interrogating tissue kinematics in their entirety, the present disclosure designs a virtual marker (VM) displacement and deformation scheme that measures displacement and strain of both tissues and body fluids in a Lagrangian frame of reference. This approach permits kinematic quantification using typically available imaging systems (ultrasound, CT-scan, or MRI) in a clinical or laboratory setting. In contrast to previously used methods that require natural marker availability in the image, the system of the present disclosure functions without the need for natural markers and yields all strain tensor field components at a much finer resolution. Moreover, these yields are instantaneous and can represent ongoing changes in strain that occur during continuous movement. Finally, these yields can produce a cumulative strain value similar to previously described technologies.

In one embodiment, ultrasonography is the ultrasound-based diagnostic imaging technique used to visualize muscles and internal organs, their size, structures and any pathological lesions. Ultrasound applies to all acoustic energy with a frequency above human hearing (20,000 Hertz or 20 kilohertz). Typical diagnostic sonography scanners operate in the frequency range of 2 to 40 megahertz, hundreds of times greater than this limit. The choice of frequency is a trade-off between the image spatial resolution and penetration depth into the patient, with lower frequencies giving less resolution and greater imaging depth.

Figure 1B:
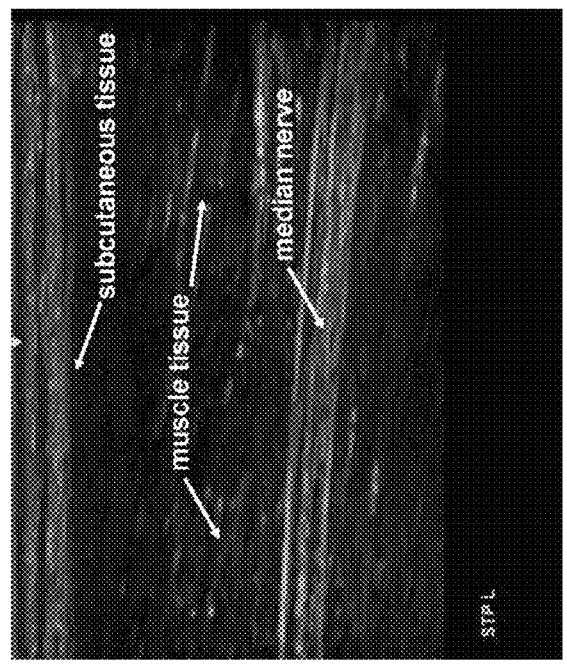
FIG. 1B depicts displacement vectors obtained from the ultrasound images.

In an exemplary embodiment, an ultrasound image of the median nerve in the forearm as shown in FIG. 1A. This image has been extracted from a video recorded at 35 frames per second with the ultrasound transducer positioned at the forearm while the subject performs cyclic wrist flexion and extension movements. A PIV displacement field is estimated across a sequential pair of images. However, PIV estimation is non-limiting. The present disclosure allows for any displacement field estimation to be capable of VM attribution. FIG. 1B represents the displacement field obtained using PIVLAB software with typical PIV parameter settings for such image pairs. In this estimate, and as an exemplary and non-limiting embodiment, the interrogation spot size for PIV cross-correlation was set to 16×16 pixels with 50% overlap. Although, no tracer particles were used in this instance, it is assumed that the nerve features represented by variation in the image intensity permit the PIV image cross-correlation algorithm to estimate local displacement.

Figure 2A:
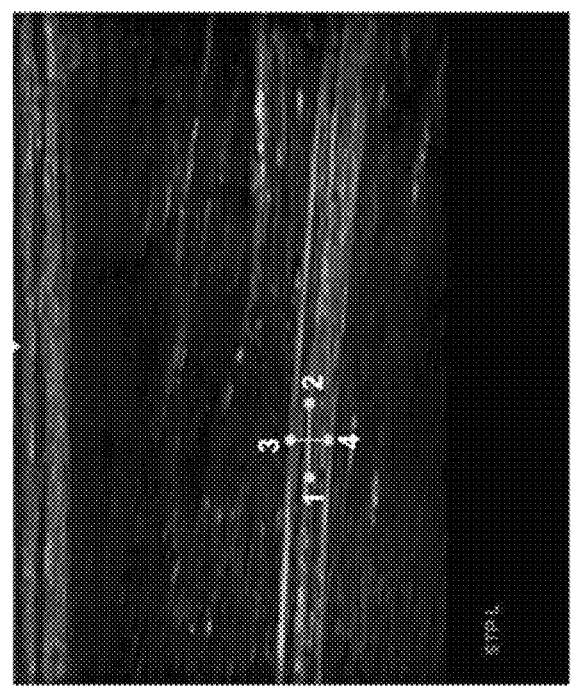
FIG. 2A depicts a virtual marker (VM) of the present disclosure located in the median nerve at the beginning of the session.

The tissue or fluid displacement field time series is obtained by repeating the PIV analysis over the video clip's entirety. Alternative image processing methods could be used to obtain displacement fields in Eulerean reference frame. To perform kinematic assessment of a portion of the nerve, 4 points are selected in the vicinity as shown in FIG. 2A (1, 2, 3, 4), which represents the beginning of the ultrasound video. The co-ordinates of the preselected 4 points (1, 2, 3, 4) represent a cross-shaped Virtual Marker (VM) and define the marker endpoints. The co-ordinates of these endpoints are updated for the next time step in the video (next frame) by using the current time step PIV displacement values. This co-ordinate updating process is repeated until all video frames are considered. The co-ordinate update can be described by the following equation:

$$\vec{x}^{p,q,r+1} = \vec{x}^{p,q,r} + \vec{X}^{p,q,r} \tag{1}$$

where $\vec{x}^{p,r,q+1}$ represents the position vector of $p^{th}$ corner point of $q^{th}$ marker at $r+1^{th}$ time instance and $\vec{X}^{\vec{x}^{p,r,q}}$ represents the PIV-estimated displacement at the nearest location of the $p^{th}$ corner in the current time step, r. Further, $\vec{x} = x_i$ and $\vec{X} = X_i$ where $i=1,2$ corresponding to x-axis and y-axis for the 2-dimensional example considered here. In addition, the definition of basis vectors will not affect the kinematic estimates with respect to the imaging plane or the initial VM configuration.

Figure 2B:
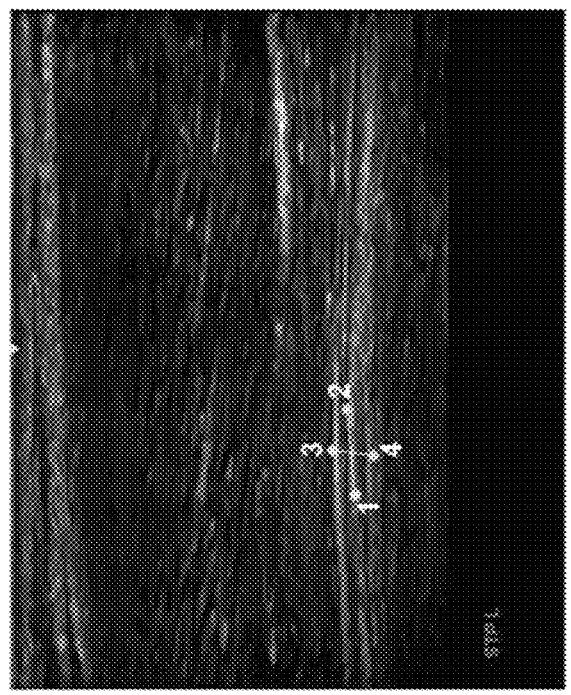
FIG. 2B a virtual marker (VM) of the present disclosure located in the median nerve at an intermediate time step of the session.

FIG. 2B shows an intermediate time step in the video. The VM has clearly moved from its original location shown in FIG. 2A and has deformed, since its end points (1, 2, 3, 4) are continuously updated. Further, the instantaneous displacement of the individual corner point can be expressed as follows:

$$\vec{X}^{p,q,r} = \vec{x}^{p,q,r} - \vec{x}^{p,q,0} \tag{2}$$

The instantaneous displacement for the $r^{th}$ VM along x-axis, $dx^{q,r}$, and y-axis, $dy^{q,r}$, is calculated by averaging displacement values obtained from eq. (2) for all VM corner points given by:

$$dx^{q,r} = 1/n \Sigma_{p=1}^{n} X_1^{p,q,r} \tag{3a}$$

$$dy^{q,r} = 1/n \Sigma_{p=1}^{n} X_2^{p,q,r} \tag{3a}$$

where n is the number of VM corner points. In addition, VM rotation can be calculated (not shown here). For the cross shaped VM considered, n=4. Further, the components of the instantaneous strain tensor (Cauchy stain) for the $r^{th}$ VM in the 2-dimensional case considered, $\varepsilon^{q,r}$, can be written in matrix form as follows:

$$\varepsilon^{q,r} = \begin{bmatrix} \varepsilon_{xx}^{q,r} & \varepsilon_{xy}^{q,r} \\ \varepsilon_{yx}^{q,r} & \varepsilon_{yy}^{q,r} \end{bmatrix}. \tag{4}$$

Here, $\varepsilon_{xx}^{q,r}$, is the longitudinal stress (along x-axis) and $\varepsilon_{yy}^{q,r}$, is the transverse stress (along y-axis), on the $r^{th}$ VM. Additionally, $\varepsilon_{xy}^{q,r} = \varepsilon_{yx}^{q,r}$, is the shear stress on the $r^{th}$ VM. The VM stress can be regarded as the stress on the median nerve at location $\vec{x}^{p,q,0}$, since the VM corner points p=1-4 were located within the nerve. These individual stress components may be calculated as follows, although alternative conventions may be utilized without affecting performance:

$$\varepsilon_{xx}^{q,r} = \frac{(x_1^{2,q,r} - x_1^{1,q,r}) - (x_1^{2,q,0} - x_1^{1,q,0})}{(x_1^{2,q,0} - x_1^{1,q,0})}, \tag{5a}$$

$$\varepsilon_{yy}^{q,r} = \frac{(x_2^{3,q,r} - x_2^{4,q,r}) - (x_2^{3,q,0} - x_2^{4,q,0})}{(x_2^{3,q,0} - x_2^{4,q,0})}, \tag{5b}$$

$$\varepsilon_{xy}^{q,r} = \left(\frac{1}{2}\right)\left(\frac{(x_2^{2,q,r} - x_2^{1,q,r}) - (x_2^{2,q,0} - x_2^{1,q,0})}{(x_2^{2,q,0} - x_2^{1,q,0})} + \frac{(x_1^{3,q,r} - x_1^{4,q,r}) - (x_1^{3,q,0} - x_1^{4,q,0})}{(x_1^{3,q,0} - x_1^{4,q,0})}\right), \tag{5c}$$

Figure 3B:
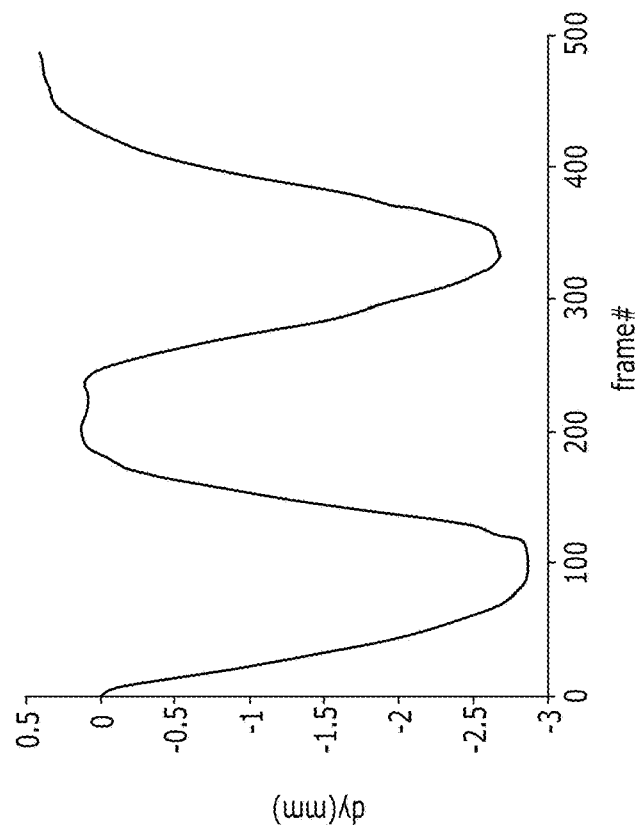
FIGS. 3A-3B each depicts cyclic displacement components corresponding to the VM shown in FIGS. 2A-B.
Figure 3A:
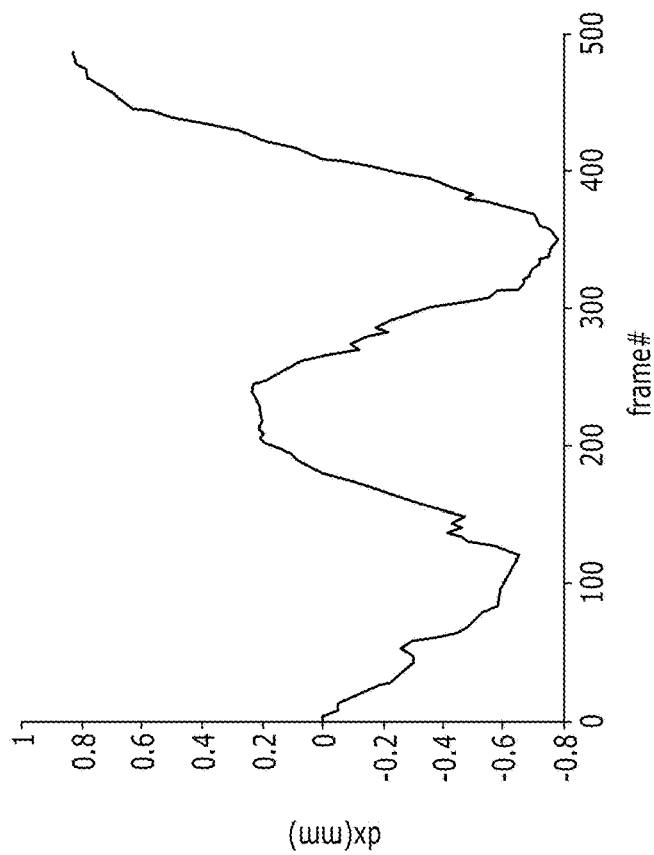

FIGS. 3A-E plot $dx^{q,r}$, $dy^{q,r}$, $\varepsilon_{xx}^{q,r}$, $\varepsilon_{yy}^{q,r}$ and $\varepsilon_{xy}^{q,r}$ respectively for the marker shown in FIGS. 2A-B. FIG. 3A and FIG. 3B clearly indicate cyclic movement of the marker along x-axis corresponding to extension-flexion movements of the wrist. The nerve in the point of view shown in FIGS.

Figure 3D:
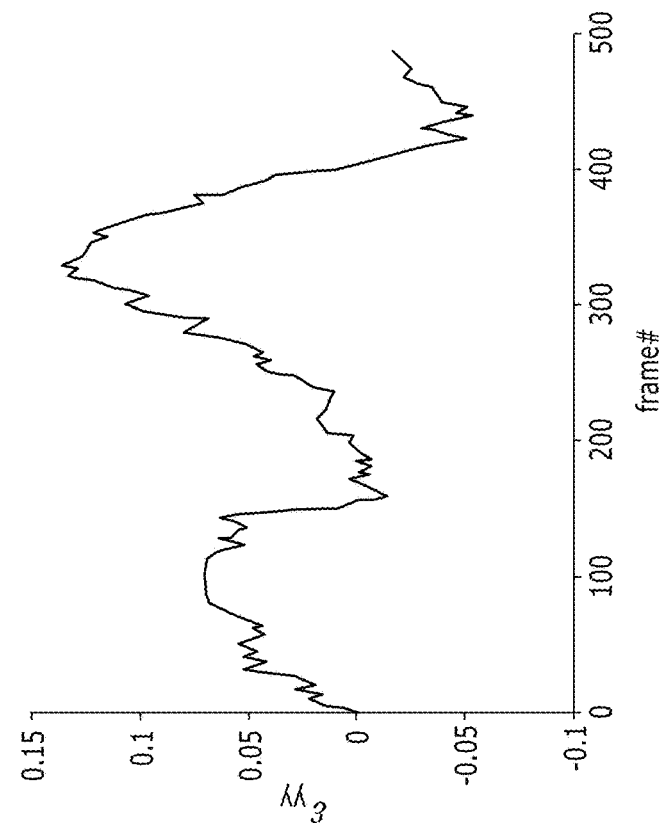
FIGS. 3C-3E each depicts cyclic strain components (linear and shear) corresponding to the VM shown in FIGS. 2A-B.
Figure 3C:
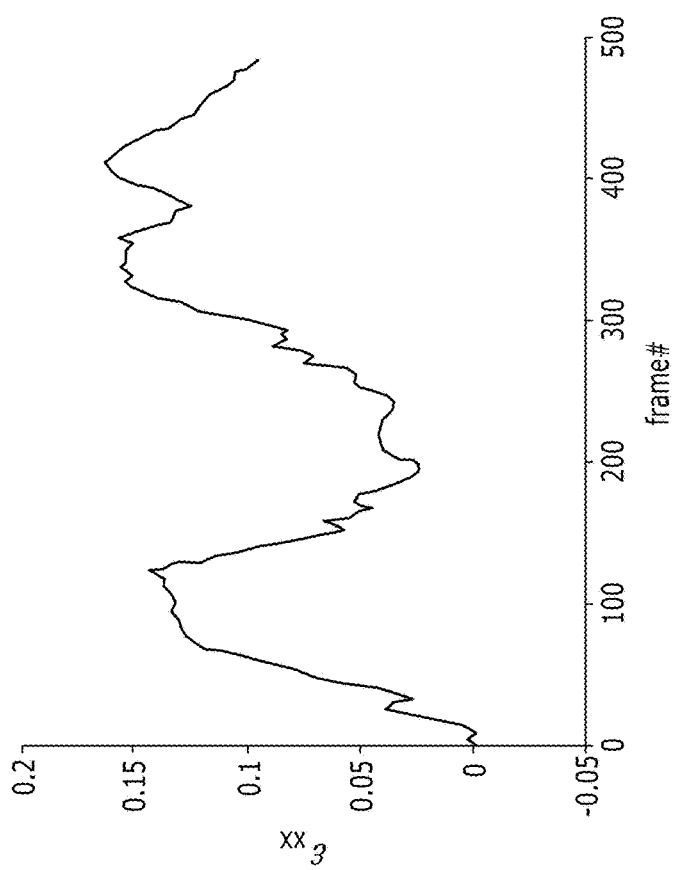
Figure 3E:
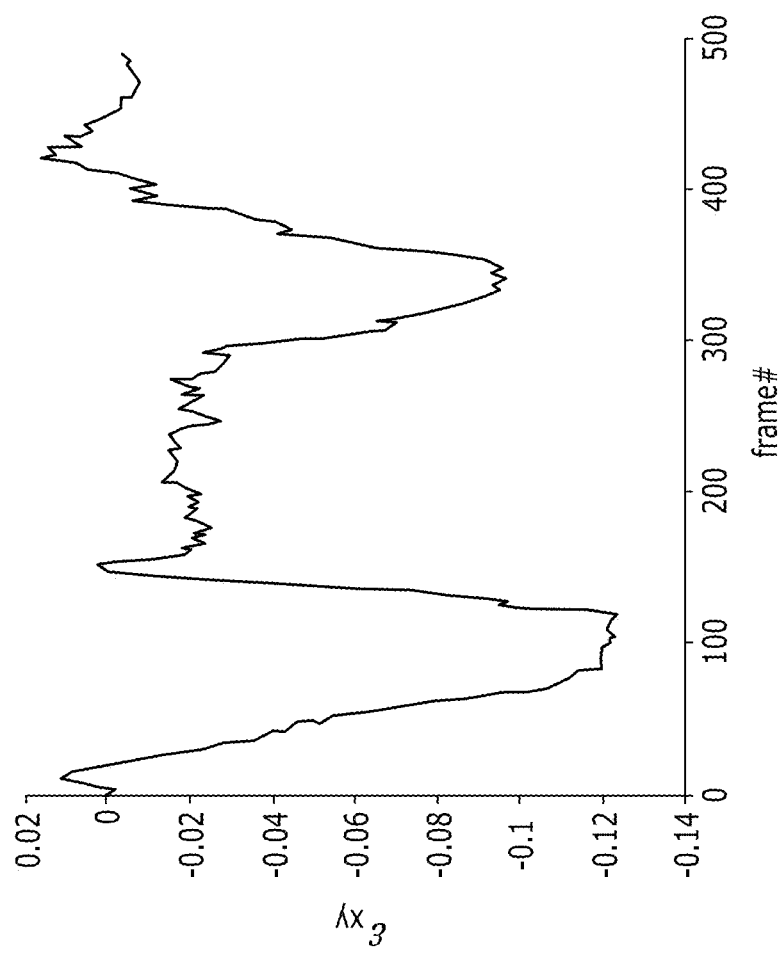

2A-B moves to the left and downwards during extension and moves back close to its initial position during flexion. FIG. 3C and FIG. 3D indicate the linear strain that is correlated to the cyclic movement. In the present case, the nerve expands along both x and y axes during extension. Additionally, FIG. 3C indicates nerve shear strain that is correlated to the cyclic wrist extension-flexion movement. This implies that the top and bottom portions of the epineurium (nerve sheath) have moved relative to each other.

Figure 4:
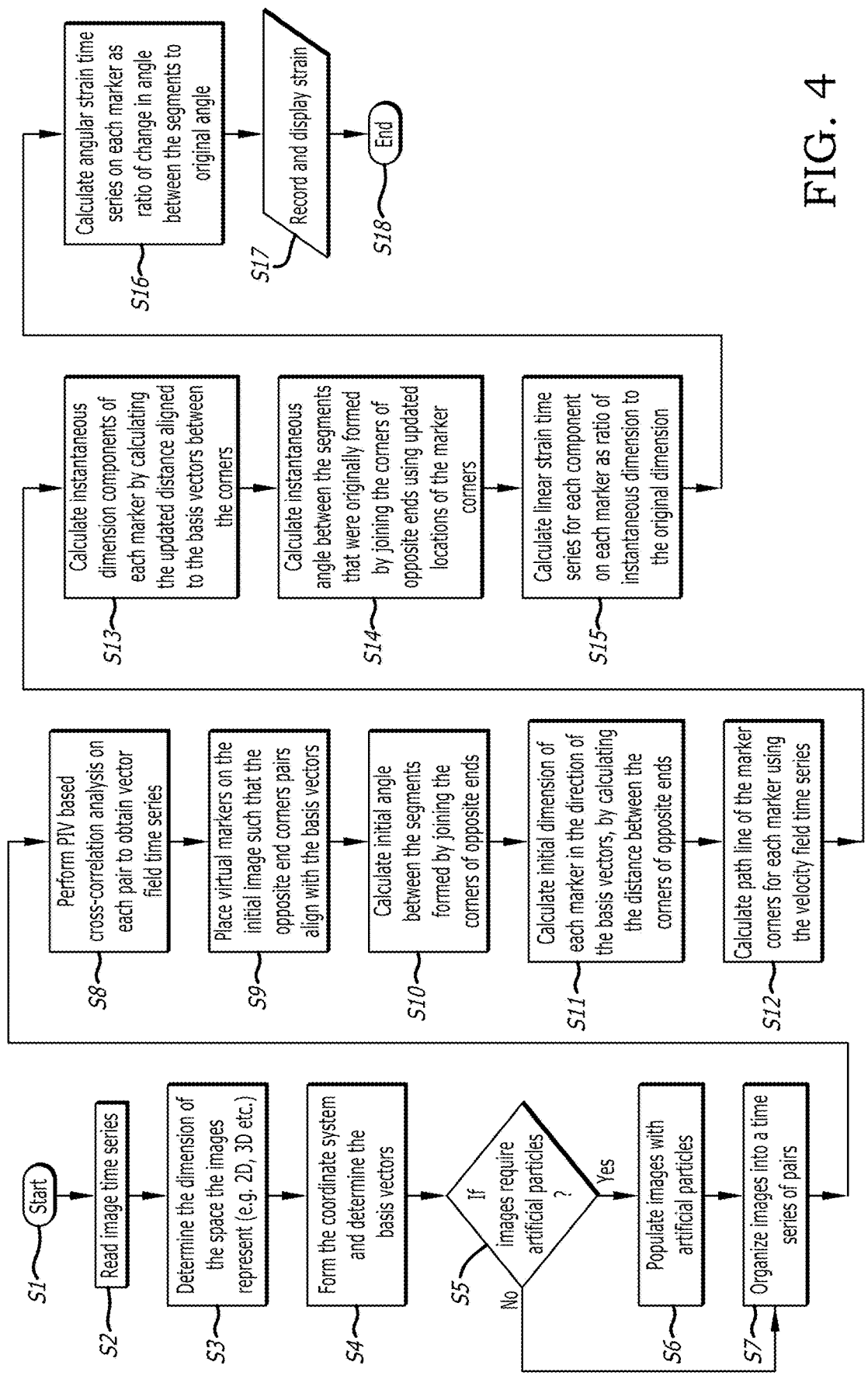
FIG. 4 depicts a flow diagram for the VM method of the present disclosure.

FIG. 4 presents a block diagram illustrating an exemplary system of the VM method of the present disclosure. Steps S1-S7 are required for pre-processing the images, separated by short time delays for PIV analysis. The PIV analysis is repeated for the entire video, leading to a displacement field time series S8. Step S9 involves locating the virtual marker (VM) in an area of interest. It should be noted that the VM method will function independently of the vector resolution. However, finer resolution will reduce discretization errors in displacement and strain calculations made in subsequent steps.

As an example, FIG. 2 displays VM's located in the median nerve tissue. The marker used here is cross-shaped. However, the markers could be of any other shape without altering the function of the VM method. The present markers are defined by their end points. Alternatively, they could be defined by segments, polygons or other workable shapes without altering the subsequent method function. Step S10 involves calculating the initial angle between segments, which is formed by joining the corners of opposite ends. In step S11 the distance between the end points along the basis vectors (e.g. x and y axis) is calculated. In step S12 the instantaneous VM corner point locations are determined, where Eq. (1) can be used to update the VM corner point locations. The Eq. (1) assumes Taylors series approximation, where higher order terms are neglected and the location update is performed using explicit Euler scheme as described by Ferziger and Peric references. However, this step could be performed using higher order schemes to reduce discretization errors. In effect, the VM corner point path lines are determined in this step. Steps S13-S16 involve calculating the displacement (Eq. 3) and various strain tensor components (Eq. 5). These results are then recorded and displayed S17, prior to completion S18.

The system of the present disclosure, in one embodiment, further includes a general-purpose computing device in the form of a computer or non-transitory computer readable storage medium configured to store instructions that, when executed by a processor included in a computer, cause the computer to confirm the origin of a product. The components of the computer can include, but are not limited to, one or more processors or processing units, a system memory, and a system bus that couples various system components including the processor to the system memory. The computer may be, for example, a desktop computer or a portable device computer, such as a cellular telephone, a smart phone, a display pager, a radio frequency (RF) device, an infrared (IR) device an Near Field Communication (NFC) device, a Personal Digital Assistant (PDA), a handheld computer, a tablet computer, a laptop computer, phablets, a wearable computer, an integrated device combining various features, such as features of the forgoing devices, or the like.

The system bus represents one or more of several possible types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus. This bus, and all buses specified in this description can also be implemented over a wired or wireless network connection, collectively a network. The bus, and all buses specified in this description can also be implemented over a wired or wireless network connection and each of the subsystems, including the processor, a mass storage device, an operating system, an image construction software, a nanoparticle movement image construction software, light signal data, the system memory, an OCT input interface, an OCT output interface, a display adapter, a display device, a human interface device, and a digital image capture device, can be contained within one or more remote computers at physically separate locations, connected through buses of this form, and via a network, in effect implementing a fully distributed system.

The computer can include a variety of computer readable media. Such media can be any available media that is accessible by the computer and includes both volatile and non-volatile media, removable and non-removable media.

The system memory includes computer readable media in the form of volatile memory, such as random access memory (RAM), and/or non-volatile memory, such as read only memory (ROM). The system memory typically contains data such as light signal data and/or program modules such as operating system, image construction software and nanoparticle movement (or cellular membrane tension level or intenial strain field change) image construction software that are immediately accessible to and/or are presently operated on by the processing unit.

The computer can also include other removable/non-removable, volatile/non-volatile computer storage media, such as a mass storage device which can provide non-volatile storage of computer code, computer readable instructions, data structures, program modules, and other data for the computer. For example, a mass storage device can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM) electrically erasable programmable read-only memory (EEPROM), and the like.

In summary, this innovative model represents an important breakthrough in displacement (and rotation) and strain measurement of tissue and body fluids in-vivo. Using the virtual marker (VM) displacement and deformation scheme that measures displacement and strain of both tissues and body fluids in a Lagrangian frame of reference has a wide variety of applications in healthcare. Such measurement of displacement and strain within tissue and body fluids are important for determining the accuracy and objectivity of clinical tests and the effectiveness of various treatment procedures commonly used in numerous healthcare domains.

Those skilled in the art will recognize that the methods and systems of the present disclosure may be implemented in many manners and as such are not to be limited by the foregoing exemplary embodiments and examples. In other words, functional elements being performed by single or multiple components, in various combinations of hardware and software or firmware, and individual functions, may be distributed among various software applications at either the client level or server level or both. In this regard, any number of the features of the different embodiments described herein may be combined into single or multiple embodiments, and alternate embodiments having fewer than, or more than, all of the features described herein are possible.

Functionality may also be, in whole or in part, distributed among multiple components, in manners now known or to become known. Thus, myriad combinations are possible in achieving the functions, features, and preferences described herein. Moreover, the scope of the present disclosure covers conventionally known manners for carrying out the described features as well as those variations and modifications that may be made to the processes, composition, or compounds described herein as would be understood by those skilled in the art now and hereafter.

Furthermore, the embodiments of methods presented and described as diagrams, schematics or flowcharts in this disclosure (such as the Figures) are provided by way of example in order to provide a more complete understanding of the technology. The disclosed methods are not limited to the operations and logical flow presented herein. Alternative embodiments are contemplated in which the order of the various operations is altered and in which sub-operations described as being part of a larger operation are performed independently.

While various embodiments have been described for purposes of this disclosure, such embodiments should not be deemed to limit the teaching of this disclosure to those embodiments. Various changes and modifications may be made to the elements and operations described above to obtain a result that remains within the scope of the systems and processes described in this disclosure.

RELATED REFERENCES

1. Kuwabara S. Peripheral nerve disorders as common diseases. *Brain and Nerve*. 2013; 65(7):1071-1075.
2. Remiche G, Kadhim H, Maris C, Mavroudakis N. Peripheral neuropathies, from diagnosis to treatment, review of the literature and lessons from the local experience. *Revue Médicale de Bruxelles*. 2013; 34(4):211-220.
3. Ellis R, Blyth R, Arnold N, Miner-Williams W. Is there a relationship between impaired median nerve excursion and carpal tunnel syndrome? A systematic review. *Journal of Hand Therapy*. 2016; Articles in press.
4. Dilley A, Odeyinde S. Greening J, Lynn B. Longitudinal sliding of the median nerve in patients with non-specific arm pain. *Manual Therapy*. 2008; 13:536-543.
5. Ochi K, Horiuchi Y, Horiuchi K, Iwamoto T, Morisawa Y, Sato K. Shoulder position increases ulnar nerve strain at the elbow of patients with cubital tunnel syndrome. *Journal of Shoulder and Elbow Surgery*. 2015:24(9):1380-1385.
6. Cassel M, Baur H, Hirschmüller A, Carlsohn A, Fröhlich K, Mayer F. Prevalence of Achilles and patellar tendinopathy and their association to intratendinous changes in adolescent athletes. *Scandinavian Journal of Medicine & Science in Sports*. 2015; 25(3):e310-e318.
7. Cook J L, Rio E, Purdam C R, Docking S I. Revisiting the continuum model of tendon pathology: What is its merit in clinical practice and research? *British Journal of Sports Medicine*. 2016; Articles in press.
8. Docking S I, Cook J. Pathological tendons maintain sufficient aligned fibrillar structure on ultrasound tissue characterization (UTC). *Scandinavian Journal of Medicine and Science in Sports*. 2016; 26(6):675-683.
9. Boyd B S, Dilley A. Altered tibial nerve biomechanics in patients with diabetes mellitus. *Muscle and Nerve*. 2014; 50(2):216-223.
10. Andrade R J, Nordez A, Hug F, et al. Non-invasive assessment of sciatic nerve stiffness during human ankle motion using ultrasound shear wave elastography. *Journal of Biomechanics*. 2016; 49:326-331.
11. Dilley A, Lynn B, Greening J, DeLeon N. Quantitative in vivo studies of median nerve sliding in response to wrist, elbow, shoulder and neck movements. *Clinical Biomechanics*. 2003; 18(10):899-907.
12. Gilbert K K, Roger James C, Apte G, et al. Effects of simulated neural mobilization on fluid movement in cadaveric peripheral nerve sections: Implications for the treatment of neuropathic pain and dysfunction. *Journal of Manual and Manipulative Therapy*. 2015; 23(4):219-225.
13. Gilbert K K, Smith M P, Sobczak S, Roger James C, Sizer P S, Brismée J M. Effects of lower limb neurodynamic mobilization on intraneural fluid dispersion of the fourth lumbar nerve root: An unembalmed cadaveric investigation. *Journal of Manual and Manipulative Therapy*. 2015; 23(5):239-245.
14. Adrian R J. Particle-imaging techniques for experimental fluid mechanics. *Annual Review of Fluid Mechanics*. 1991; 23(1):261-304.
15. Adrian R J. Twenty years of particle image velocimetry. *Experiments in Fluids*. 08/2005; 39(2):159-169.
16. Dilley A, Greening J, Lynn B, Leary R, Morris V. The use of cross-correlation analysis between high-frequency ultrasound images of longitudinal median nerve movement. *Ultrasound in Medicine and Biology*. 2001; 27(9): 1211-1218.
17. Abraham T P, Dimaano V L, Liang H-Y. Role of tissue Doppler and strain echocardiography in current clinical practice. *Circulation*. 2007; 116(22):2597-2609.
18. Thielicke W, Stamhuis E. PIVlab-towards user-friendly, affordable and accurate digital particle image velocimetry in MATLAB. *Journal of Open Research Software*. 2014; 2(1):e30.
19. Ferziger J H, Peric M. *Computational methods for fluid dynamics*. Springer Science & Business Media; 2012.

What is claimed is:

1. A system for imaging a tissue, comprising:
   an apparatus for obtaining an image time series of the tissue, the image time series comprising a plurality of images;
   an image processing apparatus for determining a virtual marker (VM), said image processing apparatus is configured for:
   forming a coordinate system for determination of basis vectors,
   organizing said images into a time series of pairs,
   performing an image analysis comprising particle image velocimetry (PIV) to obtain a vector field time series,
   identifying VM corner points on the images such that VM segments formed between VM corner points on the images align with the basis vectors,
   placing VMs upon the images in order to align said VMs with the basis vectors,
   determining instantaneous dimension components of each VM,
   establishing a linear strain time series for each VM, and
   establishing an angular strain time series based on relative displacement of the VM segments on each VM, wherein the linear strain time series and the angular strain time series represent tissue movement, continuously updating coordinates of each VM based on the vector field time series to track the tissue movement in a Lagrangian frame of reference, and a display apparatus for recording and displaying kinematics of the tissue, wherein the kinematics are the tissue movement represented by the linear strain time series and the angular strain time series.

2. The system of claim 1, wherein the image is obtained from a group consisting of: ultrasound, magnetic resonance imaging (MRI), and computed tomography (CT) scan.

3. The system of claim 1, further comprising determination of spatial variation of the kinematics of the tissue by using multiple VMs.

4. The system of claim 1, further comprising determination of temporal variation of the kinematics of the tissue by using multiple VMs.

5. The system of claim 1, further comprising determination of both spatial and temporal variation of the kinematics of the tissue by using multiple VMs.

6. The system of claim 1, wherein the image processing apparatus is further configured for populating images with artificial particles.

7. The system of claim 1, further comprising a computer.

8. A non-transitory computer readable storage medium tangibly encoded with computer-executable instructions, that when executed by a processor associated with a computing device, performs a method comprising:

obtaining an image time series comprising a plurality of images;

determining a dimension of the images;

forming a coordinate system to determine basis vectors;

organizing the images into a time series of pairs;

performing particle image velocimetry (PIV)-based analysis on each pair to obtain a displacement vector field time series;

identifying virtual marker (VM) corner points on the images such that VM segments formed between VM corner points on the images align with the basis vectors;

correlating a path line between the VM corner points for each VM using the displacement vector field time series;

determining a linear strain time series for each VM;

determining an angular strain time series based on relative displacement of the VM segments for each VM, wherein the linear strain time series and the angular strain time series represent tissue movement;

continuously updating coordinates of each VM based on the vector field time series to track the tissue movement in a Lagrangian frame of reference; and recording and displaying kinematics of said tissue, wherein the kinematics are the tissue movement represented by the linear strain time series and the angular strain time series.

9. The non-transitory computer-readable storage medium of claim 8, wherein the image is obtained from a group consisting of: ultrasound, magnetic resonance imaging (MRI), and computed tomography (CT) scan.

10. The non-transitory computer-readable storage medium of claim 8, further comprising determination of spatial variation of the kinematics of the tissue by using multiple VMs.

11. The non-transitory computer-readable storage medium of claim 8, further comprising determination of temporal variation of the kinematics of the tissue by using multiple VMs.

12. The non-transitory computer-readable storage medium of claim 8, further comprising determination of both spatial and temporal variation of the kinematics of the tissue by using multiple VMs.

13. The non-transitory computer-readable storage medium of claim 8, further comprising populating images with artificial particles.

14. A method for determining tissue kinematics, comprising:

obtaining an image time series comprising a plurality of images;

determining a dimension of the images;

forming a coordinate system to determine basis vectors;

organizing the images into a time series of pairs;

performing particle image velocimetry (PIV)-based analysis on each pair to obtain a displacement vector field time series;

identifying virtual marker (VM) corner points on the images such that VM segments formed between VM corner points on the images align with the basis vectors;

correlating a path line between the VM corner points for each VM using the displacement vector field time series;

determining a linear strain time series for each VM;

determining an angular strain time series based on relative displacement of the VM segments for each VM, wherein the linear strain time series and the angular strain time series represent tissue movement;

continuously updating coordinates of each VM based on the vector field time series to track the tissue movement in a Lagrangian frame of reference; and recording and displaying kinematics of said tissue, wherein the kinematics are the tissue movement represented by the linear strain time series and the angular strain time series.

15. The method of claim 14, further comprising obtaining the image time series from a group consisting of: ultrasound, magnetic resonance imaging (MRI), and computed tomography (CT) scan.

16. The method of claim 14, further comprising determining spatial variation of the kinematics of the tissue by using multiple VMs.

17. The method of claim 14, further comprising determining temporal variation of the kinematics of the tissue by using multiple VMs.

18. The method of claim 14, further comprising determining both spatial and temporal variation of the kinematics of the tissue by using multiple VMs.

19. The method of claim 14, further comprising populating images with artificial particles.

* * * * *